No. 732,650. PATENTED JUNE 30, 1903.
H. H. McINTIRE.
PHOTOGRAPHIC PRINTING APPARATUS.
APPLICATION FILED NOV. 24, 1902.
NO MODEL. 2 SHEETS—SHEET 1.
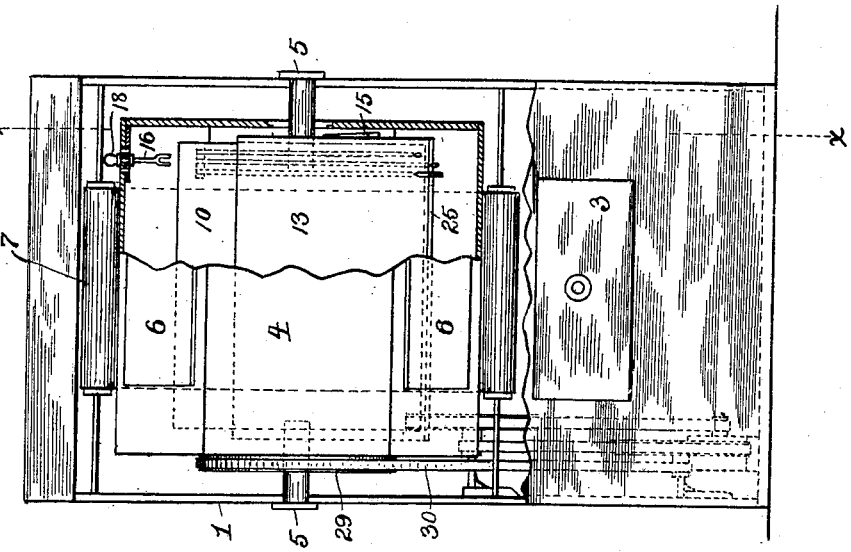
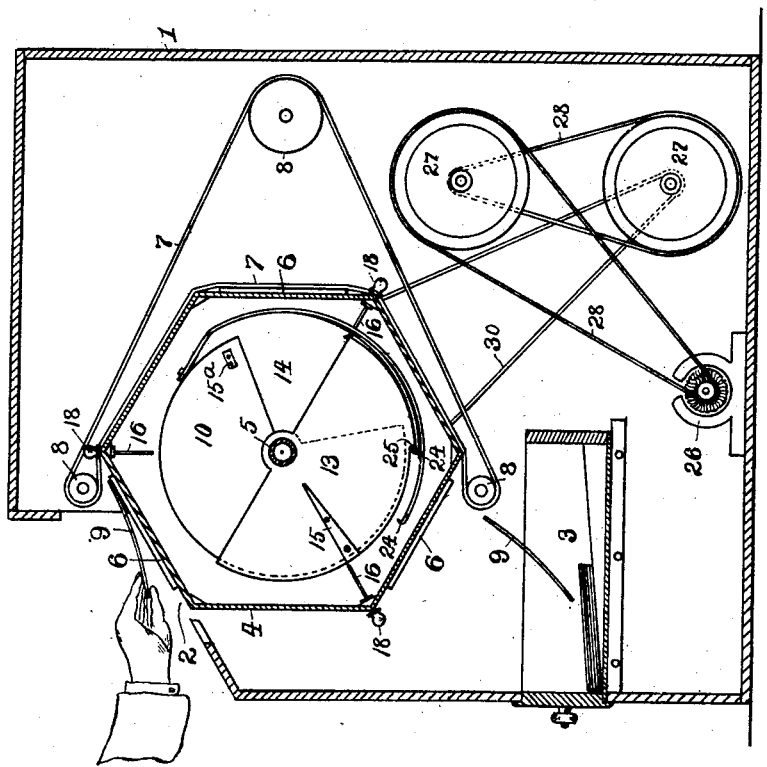

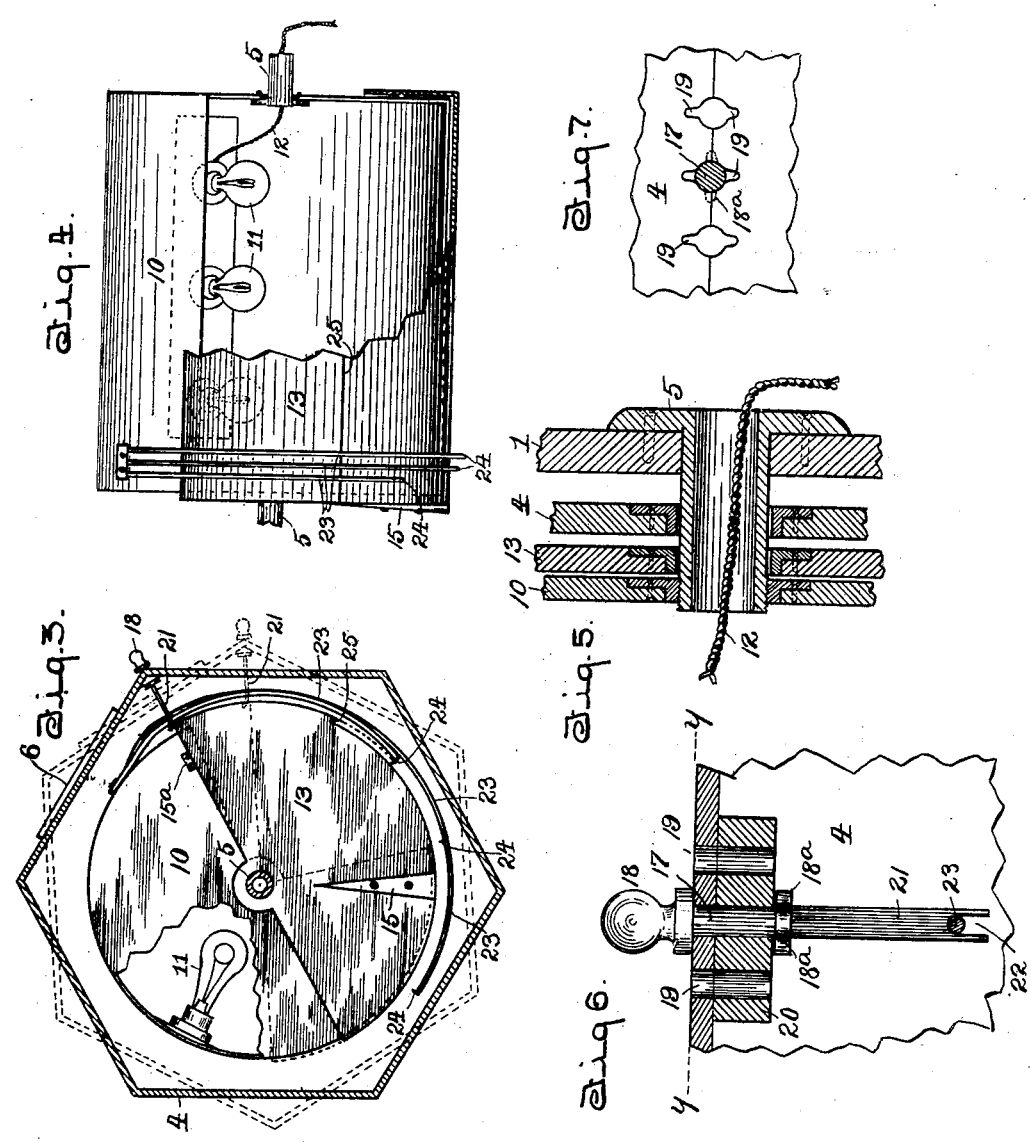

No. 732,650. Patented June 30, 1903.

UNITED STATES PATENT OFFICE.

HERVEY H. McINTIRE, OF SOUTH BEND, INDIANA, ASSIGNOR TO ST. JOSEPH LOAN & TRUST COMPANY, TRUSTEE, OF SOUTH BEND, INDIANA.

PHOTOGRAPHIC-PRINTING APPARATUS.

SPECIFICATION forming part of Letters Patent No. 732,650, dated June 30, 1903.

Application filed November 24, 1902. Serial No. 132,667. (No model.)

*To all whom it may concern:*

Be it known that I, HERVEY H. MCINTIRE, a citizen of the United States, residing at South Bend, in the county of St. Joseph and State of Indiana, have invented certain new and useful Improvements in Photographic-Printing Apparatus; and I do hereby declare the following to be a full, clear, and exact description of the invention, such as will enable others skilled in the art to which it appertains to make and use the same.

This invention relates to improvements in photographic-printing apparatus.

The object of the invention is to provide a machine for rapidly printing photographs on cut sheets of sensitized developing-paper which when applied to the negative is automatically held thereto, carried into the case to be acted upon by a light which is automatically emitted for a predetermined interval, and finally discharged into a receptacle ready for the finishing operation.

The invention embodies a revoluble platen adapted to carry a plurality of negatives, a light-compartment around which the platen revolves, a shutter to control the emission of light, and means for operating the shutter and holding it open for a predetermined time, all as will be hereinafter fully described and the novelty thereof particularly pointed out and distinctly claimed.

I have fully and clearly illustrated the invention in the annexed drawings, forming a part of this specification, wherein similar reference notations designate like parts appearing in the several illustrations.

Reference being had to the drawings, Figure 1 is a longitudinal vertical section of the apparatus on the line $x\,x$ of Fig. 2, showing the light-compartment or drum with its shutter in end elevation and the shutter open. Fig. 2 is a front elevation with a portion of the case and platen broken away to expose the shutter, its trip-arm, and the spring-stops for the shutter. Fig. 3 is a transverse section of the platen with the drum therein having a portion broken away to expose the lamp and showing in dotted lines the position of the parts when the shutter is open. Fig. 4 is an elevation of the drum with one end of the shutter broken away to expose the lamps. Fig. 5 is a detail in transverse section of one of the stub-axles, showing the bearings for the platen and shutter. Fig. 6 is a detail view of the adjustable trip-arm mounted in the walls of the platen. Fig. 7 is a section on the line $y\,y$ of Fig. 6.

Making renewed reference to the drawings, 1 designates a casing, having an opening 2 in its front for the introduction of the cut sheets of sensitized developing-paper to the negatives, and near the bottom of the casing is a drawer 3 for the deposition of the printed photographs. The platen 4 is journaled on hollow stub-axles 5, which are secured to the sides of the casing. This platen consists of a hollow case having angular sides and, as shown in the drawings, may be made hexagonal to hold a plurality of negatives 6, which are secured to the flat sides over the openings formed therein. An endless band 7, carried by pulleys 8, contacts with the sides of the platen and is so arranged that one-half of the perimeter of the platen is always in engagement with the band, which presses with sufficient force to hold the tympan or sensitized paper 9 against the negative until the picture has been printed, when it is discharged into the drawer 3 in the casing.

Rigidly secured to the stub-axles 5 and within the platen is a drum or light-compartment 10, having a series of electric incandescent lights 11, provided with the conducting-wires 12, which pass through the hollow axle. The drum is further provided with an opening 14, which is normally closed by a shutter 13. The shutter 13 consists of a semicylindrical shell revolubly mounted on the stub-axles and covering part of the drum 10, with which it is concentrically disposed, and on one end thereof is a weight 15, adapted to reset the shutter to close the opening 14 in the drum and exclude the light from the tympan until the next negative has been brought opposite the opening, when the shutter is again ready to be opened. A stop $15^a$ is secured to the drum, against which the upper edge of the shutter contacts.

The means for opening the shutter consists of a trip-arm 16, removably and adjustably mounted in the platen. This trip-arm has a round shank portion 17, provided at one end thereof with a flanged head 18, which extends on the exterior of the platen, and on the other end with oppositely-disposed lugs 18ª, which are adapted to fit oppositely-disposed grooves 19 in the block 20 of the platen when the trip-arm is inserted into or removed from any of the keyhole-slots in the block, which, as shown, contain a series of such slots arranged longitudinally in the corners of the platen, and after the trip-arm has been inserted it may be locked therein by turning it so that the lugs are out of alinement with the grooves, as shown in Figs. 6 and 7. This shank portion terminates in an inwardly-extending spring-arm 21, having a bifurcated end 22, the forks of which are bent slightly out of the plane of the arm, the purpose for which will presently appear. Secured to the stationary portion of the drum and extending around the shutter are a plurality of resilient wire arms 23, each of a different length and each having its free end bent inwardly to provide a stop 24, with which the shoulder 25 on the shutter engages to limit the movement of the latter when revolved to emit the light to the negative. As the platen revolves around the drum it carries the trip-arms with it, and the forked ends of the latter engage the upper edge of the shutter, while one of the resilient arms 23 is engaged in the bifurcation 22 and depressed to bring the stop 24 in the path of the shoulder 25 on the shutter, and when engaged thereby, as shown in dotted lines in Fig. 3, the negative on the platen is opposite the opening in the stationary portion of the drum, and the light is emitted to print the picture. Now as the platen continues to revolve the trip-arm 21 will disengage from the edge of the shutter, but by virtue of its resilient nature and its bent ends will press with sufficient force upon the periphery of the shutter and the spring-arm 23 to hold the shutter open until the tympan has reached the shoulder 25 and the end of the spring-arm 23, when the shutter is released from the trip-arm and reset by means of the weight 15. Each of the spring-arms 23 is set so as to be opposite each keyhole-slot in the block 20, so that the trip-arms when mounted in any of the slots will engage its corresponding spring-arm, and the spring-arms being of different length will cause the shutter to expose a larger or smaller opening in the drum and hold it open for a longer or shorter period. Thus if any of the negatives carried by the platen require a longer or shorter exposure for printing the trip-arm in front of such negative may be adjusted in one of the keyhole-slots 19 to engage a long or short spring-arm. In Fig. 3 the trip-arm is set to engage the shortest spring-arm for a short exposure, while in Fig. 1 it is set to engage the next longest or intermediate spring-arm.

It is to be understood that I do not limit myself to any particular number of prints that may be made at one revolution of the platen, and many changes in the form, proportion, and minor details may be resorted to without departing from the principle of the invention or sacrificing any of the advantages thereof.

In the bottom of the case is a suitable motor 26 and pulleys 27 27, which are connected by the belts 28, and on one end of the platen is a pulley 29, (shown in Fig. 2,) which is driven by a belt 30 from one of the pulleys 27.

Having thus described my invention, what I claim, and desire to secure by Letters Patent, is—

1. A photographic-printing apparatus provided with a revoluble platen, a light-compartment within the platen, a revoluble shutter, and means carried by the platen to operate the shutter.

2. A photographic-printing apparatus provided with a revoluble platen, a stationary drum around which the platen revolves, a light in the drum, a shutter on the drum for emitting the light to the negative carried by the platen, means on the platen to operate the shutter, and means to reset the shutter.

3. A photographic-printing apparatus provided with a revoluble platen adapted to carry the negatives and tympans, a drum mounted in the platen and provided with a light, a shutter normally closing an opening in the drum and means on the platen to open the shutter and hold it open for a predetermined time during the revolution of the platen.

4. A photographic-printing apparatus provided with a revoluble platen upon which the negatives are secured, a drum provided with an opening around which the platen revolves, a light in the drum, a revoluble shutter adapted to normally close the opening, means for revolving the platen, means carried by the platen to open the shutter and hold it open for a predetermined time, and means on the drum coöperating with the shutter-opening means for limiting the opening movement of the shutter.

5. A photographic-printing apparatus, a case, a stationary drum in the case provided with an opening, a light in the drum, a platen adapted to revolve around the drum and carry the negatives, a shutter adapted to normally close the opening in the drum, an endless band in the case adapted to engage the platen to hold the photographic paper on the negatives, means for driving the platen, and means carried by the platen to open the shutter and hold it open for a predetermined time during the revolution of the platen.

6. In a photographic-printing apparatus, a case, a stationary drum in the case provided with an opening, a light in the drum, a platen adapted to revolve around the drum and carry the negatives, a revoluble shutter adapted to normally close the opening in the drum, means in the case to hold the photographic paper in engagement with the negatives, means to drive the platen, means carried by the platen to open the shutter and hold it open while the photograph is printed, and means on the drum adapted to be operated by the shutter-opening means to limit the opening of the shutter.

7. In a photographic-printing apparatus, a case having hollow axles mounted therein, a drum fixed to the axles and provided with a light and an opening, an electric conductor passing through one of said hollow axles and connected with the lights, a shutter journaled on the axles to normally close the opening in the drum, a platen carrying the negatives journaled on the axles and adapted to revolve around the drum, and means carried by the platen to open the shutter and hold it open while the photograph is being printed.

8. In a photographic-printing apparatus, a case having a drum therein provided with a light and an opening, a shutter adapted to revolve around said drum and normally close the opening therein, a platen adapted to hold the negatives and photographic paper and revolve around said drum, trip-arms carried by the platen to open the shutter, a spring-arm secured to the drum and adapted to coöperate with the trip-arm to bring the spring-arm into engagement with the shutter and limit the movement of the latter.

9. In a photographic-printing apparatus, a case having a drum therein provided with a light and an opening, a shutter adapted to revolve around said drum and normally close the opening therein, a platen having angular sides to which the negatives are attached and adapted to revolve around the drum, an endless band adapted to engage the platen and hold the photographic paper to the negatives, a plurality of spring-arms of different lengths secured to the drum and extending around the shutter and having their free ends bent inwardly, removable trip-arms carried by the platen and adapted to be adjusted opposite any of the spring-arms to engage the shutter and the trip-arms to open the shutter and throw the bent ends of the spring-arms in the path of the shutter to limit its movement, whereby the shutter may be held open for longer or shorter periods for different exposures.

10. In a photographic-printing apparatus, a case having an opening for the introduction of the photographic sheets, a drum in the case provided with a light and an opening, a shutter adapted to revolve around the drum and normally close the opening therein and having a shoulder formed thereon, a platen having angular sides to which the negatives are attached, means to revolve the platen around the drum, means to feed and hold the photographic sheets to the negatives and deliver them to the bottom of the case, a plurality of spring-arms of different lengths secured to the drum and having their free ends formed with a stop to engage the shoulder on the shutter but normally held from engagement therewith, removable trip-arms carried by the platen for opening the shutter and adapted to be adjusted opposite any one of the spring-arms and provided with a bifurcated end which engages the spring-arms to throw the stop into the path of the shoulder and means on the shutter to reset the same.

In testimony whereof I affix my signature in presence of two witnesses.

HERVEY H. McINTIRE.

Witnesses:
GEORGE OLTSCH,
MAGGIE OLTSCH.